United States Patent
Ben-Yehuda et al.

(10) Patent No.: US 8,132,185 B2
(45) Date of Patent: Mar. 6, 2012

(54) DEVICE, SYSTEM, AND METHOD OF CLASSIFYING A WORKLOAD OF A SOFTWARE SERVICE

(75) Inventors: Shmuel Ben-Yehuda, Haifa (IL); Dan Pelleg, Haifa (IL)

(73) Assignee: International Business Machines Corporation, Armonk, NY (US)

(*) Notice: Subject to any disclaimer, the term of this patent is extended or adjusted under 35 U.S.C. 154(b) by 1198 days.

(21) Appl. No.: 11/859,810

(22) Filed: Sep. 24, 2007

(65) Prior Publication Data

US 2009/0083737 A1    Mar. 26, 2009

(51) Int. Cl.
*G06F 3/00* (2006.01)
*G06F 9/44* (2006.01)
*G06F 9/46* (2006.01)
*G06F 13/00* (2006.01)

(52) U.S. Cl. .................... 719/320; 709/221; 709/226

(58) Field of Classification Search .................. 718/105, 718/1, 100; 719/311, 320; 709/221, 226
See application file for complete search history.

(56) References Cited

U.S. PATENT DOCUMENTS

| | | | |
|---|---|---|---|
| 4,485,440 A | 11/1984 | Duff et al. | |
| 5,974,536 A | 10/1999 | Richardson | |
| 6,513,065 B1 * | 1/2003 | Hafez et al. | 709/224 |
| 6,691,067 B1 * | 2/2004 | Ding et al. | 702/186 |
| 7,027,051 B2 * | 4/2006 | Alford et al. | 345/440 |
| 7,912,955 B1 * | 3/2011 | Machiraju et al. | 709/226 |
| 2006/0064691 A1 | 3/2006 | Blaisdell et al. | |
| 2006/0288348 A1 | 12/2006 | Kawamoto et al. | |
| 2007/0078641 A1 | 4/2007 | Bank et al. | |

FOREIGN PATENT DOCUMENTS

WO    WO2006077215 A1    7/2006

OTHER PUBLICATIONS

S. Petit et al., "Characterizing the dynamic behavior of workload execution in SVM systems", Proceedings. 16th Symposium on Computer Architecture and High Performance Computing, 2004, 230-7.
L.E. Heindel et al., "Workload characterization and analysis: transition from centralized systems to open systems", CMG Proceedings, v 1, 1994, p. 385-394 (Abstract only).

* cited by examiner

*Primary Examiner* — Diem Cao
(74) *Attorney, Agent, or Firm* — Jason Far-Hadian

(57) ABSTRACT

Some embodiments include, for example, devices, systems, and methods of classifying a workload of a software service. A method of classifying a workload of a software service may include, for example, sampling a plurality of values of at least one parameter of the software service by performing out-of-band monitoring of the at least one parameter; and classifying the workload of the software service by selecting a workload classification from a plurality of predefined workload classifications based on the plurality of values. Other embodiments are described and claimed.

20 Claims, 3 Drawing Sheets

DEVICE, SYSTEM, AND METHOD OF CLASSIFYING A WORKLOAD OF A SOFTWARE SERVICE

FIELD

Some embodiments are related to the field of software services and, more particularly, to the field of classifying a workload of a software service.

BACKGROUND

Performance of a computing system may depend on a type of workload applied to the computing system. In one example, an Operating System (OS) kernel may be subject to different Input/Output (I/O) workloads, for example, by different types of applications, which may be run by the OS kernel. In another example, an application server may be subject to different workloads, for example, by different application code. In a further example, a virtualization system may be subject to different workloads, for example, by different virtualized OS guests.

Identifying the workload applied to the computer system may enable managing resources of the computing system efficiently.

In some virtualized systems, a virtualized guest may be manually pre-classified into one of a plurality of pre-defined classes, for example, "test", "web server", "database", wherein each of the classes identifies an expected load pattern and/or behavior.

SUMMARY

Some embodiments include, for example, devices, systems, and methods of classifying a workload of a software service.

In some demonstrative embodiments, a method of classifying a workload of a software service may include sampling a plurality of values of at least one parameter of the software service by performing out-of-band monitoring of the at least one parameter; and classifying the workload of the software service by selecting, based on the plurality of values, a workload classification from a plurality of predefined workload classifications.

Some demonstrative embodiments include a computing system capable of running at least one software service. The system may include an out-of-band-monitor to monitor at least one parameter of the software service; and a workload classifier capable of classifying the workload of the software service by selecting, based on a plurality of sampled values of the at least one parameter, a workload classification from a plurality of predefined workload classifications.

Some demonstrative embodiments include a computer program product comprising a computer-useable medium including a computer-readable program, wherein the computer-readable program when executed on a computer causes the computer to sample a plurality of values of at least one parameter of a software service by performing out-of-band monitoring of the at least one parameter; and classify the workload of the software service by selecting, based on the plurality of values, a workload classification from a plurality of predefined workload classifications.

Some embodiments include, for example, a computer program product including a computer-useable medium including a computer-readable program, wherein the computer-readable program when executed on a computer causes the computer to perform methods in accordance with some embodiments.

Some embodiments may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
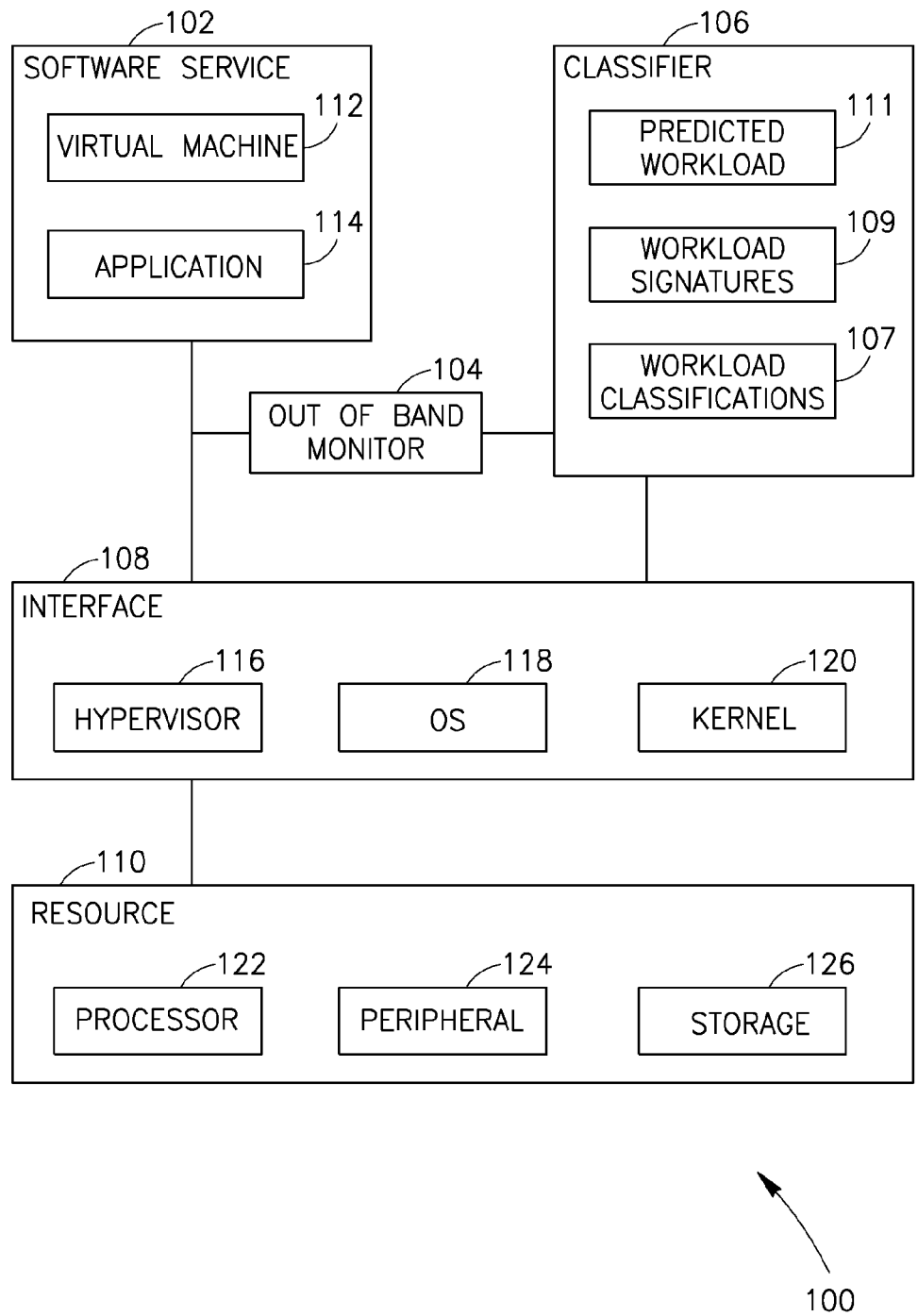
FIG. 1 is a schematic block diagram illustration of a system in accordance with some demonstrative embodiments.

In the following detailed description, numerous specific details are set forth in order to provide a thorough understanding of some embodiments of the invention. However, it will be understood by persons of ordinary skill in the art that embodiments of the invention may be practiced without these specific details. In other instances, well-known methods, procedures, components, units and/or circuits have not been described in detail so as not to obscure the discussion.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein includes, for example, "multiple" or "two or more". For example, "a plurality of items" includes two or more items.

Some demonstrative embodiments may be implemented using a computing system or a host. Although the invention is not limited in this respect the computing system or host include, for example, a processor, an input unit, an output unit, a memory unit, a storage unit, a communication unit, and/or any other suitable hardware and/or software components. The processor includes, for example, a central processing unit (CPU), a digital signal processor (DSP), a microprocessor, a host processor, a controller, a plurality of processors or controllers, a chip, a microchip, one or more circuits, circuitry, a logic unit, an integrated circuit (IC), an application-specific IC (ASIC), or any other suitable multi-purpose or specific processor or controller. The processor may, for example, execute instructions, execute one or more software applications, and process signals and/or data transmitted and/or received by the computing system. The input unit includes, for example, a keyboard, a keypad, a mouse, a touch-pad, a stylus, a microphone, or other suitable pointing device or input device. The output unit includes, for example, a cathode ray tube (CRT) monitor or display unit, a liquid crystal display (LCD) monitor or display unit, a screen, a monitor, a speaker, or other suitable display unit or output device. The memory unit includes, for example, a random access memory (RAM), a read only memory (ROM), a dynamic RAM (DRAM), a synchronous DRAM (SD-RAM), a flash memory, a volatile memory, a non-volatile memory, a cache memory, a buffer, a short term memory unit, a long term memory unit, or other suitable memory units or storage units. The storage unit includes, for example, a hard disk drive, a floppy disk drive, a compact disk (CD) drive, a CD-ROM drive, a digital versatile disk (DVD) drive, or other suitable removable or non-removable storage units. The memory unit and/or storage unit store, for example, data processed by the computing system. The communication unit includes, for example, a wired or wireless network interface card (NIC), a wired or wireless modem, a wired or wireless receiver and/or transmitter, a wired or wireless transmitter-receiver and/or transceiver, a radio frequency (RF) communication unit or transceiver, or other units able to transmit and/or receive signals, blocks, frames, transmission streams, packets, messages and/or data.

Although embodiments of the invention are not limited in this regard, the term "Virtual Machine" (VM) as used herein may include one or more environments able to emulate, simulate, virtualize, execute, directly execute, run, implement, or invoke a hardware component, a software component, an Operating System (OS), an application, a code, a set of instructions, or the like. The VM may be implemented using hardware components and/or software components. In one example, the VM is implemented as a software application executed by a processor, or as a hardware component integrated within a processor.

Although embodiments of the invention are not limited in this regard, the term "software service" as used herein may include an environment, program, application, process, procedure, function, object, and/or task capable of using one or more resources. In one example, the software service may include a VM. In another example, the software service may include an application, a program, and/or an application program, which may be associated with an OS, or an OS kernel.

Although embodiments of the invention are not limited in this regard, the term "resource" as used herein may include any suitable device, apparatus, article, unit, system, sub-system, module, component, and/or medium to be used by a software service. The resource may be implemented as a physical hardware resource, e.g., using any suitable mechanical, magnetic, electrical, or electronic device, module, unit, component or system; as a virtualized hardware resource, e.g., using any suitable virtualization method; and/or as a software resource.

At an overview, some demonstrative embodiments may be implemented to classify a workload of a software service into one of a predefined set of workload classifications corresponding to a set of workload schemes, respectively. The workload classification may be implemented, for example, by a management system, to manage the software service. The workload classification may be performed automatically and/or dynamically, e.g., substantially in real-time.

In some demonstrative embodiments, out-of band monitoring may be performed to at least one parameter of the software service. The workload of the software service may be classified by sampling, e.g., periodically, values of the at least one parameter of the software service. The parameter may include any suitable attribute or characteristic, which may vary during the operation of the software service. The at least one parameter may be related, for example, to the workload. In one example, which may be implemented in management of a virtualized guest, an instruction pointer of a processor is sampled at a predefined frequency, e.g., 100 hertz (Hz). In another example, which may be implemented for input/output (I/O) scheduling, relative movements of a disk head may be sampled. In other examples, the at least one parameter may include addresses for read and/or write on a memory bus, a network activity, storage channel communications, and the like.

In some demonstrative embodiments, one or more statistical values may be determined based on the sampled values, and a workload signature of the software service may be determined based on the statistical values. In one example, the workload signature may be determined by tallying the sampled values during a predefined time period, for example, at least thirty seconds, e.g., at least one minute; generating a histogram representing a number or frequency of occurrences of a plurality of the sampled values; sorting the plurality of the sampled values by decreasing frequency; and defining the workload signature according to a predefined number of the sampled values the values having the maximal frequency.

In some demonstrative embodiments, a set of workload signatures (also referred to as a "bank of workload signatures") including a plurality of workload signatures corresponding to the software service may be predefined, e.g., off-line. Each of the workload signatures of the bank of workload signatures, may be defined, for example, by applying to the software service a different workload scheme, and sampling the at least one parameter of the software service. Optionally, one or more workload signatures of the bank of workload signatures may be associated with any suitable additional information including, for example, a predicted workload immediately following the occurrence of the workload signature.

In some demonstrative embodiments, a runtime workload signature of the software service is determined during runtime, for example, by sampling runtime values of the at least one parameter, and determining runtime statistical values corresponding to the sampled runtime values. The runtime workload signature is compared to the bank of workload signatures, and the runtime workload of the software service is classified according, for example, to a workload classification corresponding to one of the predefined workload signatures having, for example, a best match with the runtime workload signature.

In some demonstrative embodiments, a management system may allocate resources to the software service based on the runtime workload classification, optionally taking into account any additional information in the annotations corresponding to the workload signature.

In some demonstrative embodiments, the workload of the software service may be dynamically classified, e.g., during a plurality of consecutive time periods. For example, a first workload classification may be assigned to the software service based on a first plurality of runtime values of the at least one parameter, which are sampled during a first runtime period. A second plurality of runtime values of the at least one parameter may be sampled during a second runtime period, e.g., following the first runtime period, and the workload of the software service may be re-classified by re-selecting a workload classification from the plurality of predefined workload classifications based on the second plurality of sampled values. Accordingly, the workload of the software service may be dynamically classified during different runtime periods.

Reference is now made to FIG. 1, which schematically illustrates a system 100 in accordance with some demonstrative embodiments.

In some demonstrative embodiments, system 100 includes at least one software service 102 associated with at least one resource 110 via an interface 108, e.g., as described in detail below. Resource 110 may include, for example, at least one processor 122, one or more peripherals 124, at least one storage device 126, e.g., a disk, and/or any other physical hardware resource, virtualized hardware resource, software resource, and the like.

In one demonstrative embodiment, software service 102 includes a virtual machine 112, which may include, for example, a guest OS, and/or one or more guest applications; and/or interface 108 includes a hypervisor 116. In one example, hypervisor 116 runs on processor 122, and hosts one or more virtual machines, e.g., virtual machine 112. Hypervisor 116 may also selectively serve requests of virtual machine 112 to utilize resource 110, e.g., peripherals 124, and/or storage 126.

In another demonstrative embodiment, software service 102 includes a program application 114; and/or interface 108 includes an OS 118, and/or a kernel 120. OS 118 and/or kernel 120 may run on processor 122, and may manage one or more applications, e.g., including application 114. OS 118 and/or kernel 120 may also selectively serve requests of application 114 to utilize resource 110, e.g., peripherals 124, and/or storage 126.

In some demonstrative embodiments, system 100 includes an out-of-band monitor 104 to perform out-of-band monitoring of software service 102. Although embodiments of the invention are not limited in this regard, the term "out of band monitoring of a software service" as used herein may include monitoring information exchanged between the software service and an interface. The monitored information may include, for example, requests from the software service for resource allocations, responses to the requests for resource allocations, actual usage of resources by the software service, network traffic to/from the software service, one or more indications of a state of operation of the software service, and/or any other suitable information. The out-of-band monitoring may not affect the operation of the software service, may not require assistance from the software service, may not require the software service to be aware of the monitoring, and/or may not require adapting, modifying or altering the software service.

In one embodiment, out-of-band monitor 104 and interface 108 may be implemented as separate elements of system 100. In another embodiment, out-of-band monitor 104 may be implemented as part of interface 108, e.g., as part of hypervisor 116.

In some demonstrative embodiments, out-of-band monitor 104 performs any suitable monitoring operations including, for example, continuous monitoring, periodical monitoring, random monitoring, and/or pseudo-random monitoring.

In some demonstrative embodiments, out-of-band monitor 104 performs out-of-band monitoring of at least one parameter of software service 102, e.g., at least one parameter (the "monitored parameter") related to a workload of service 102. Although embodiments of the invention are not limited in this respect, in some demonstrative embodiments the monitored parameter may include, for example, a value of an instruction pointer of processor 122, relative movements of a disk head of storage 126, addresses for read and/or write on a memory bus associated with software service 102, a parameter relating to a network activity performed by software service 102, a parameter related to storage channel communications performed by software service 102, a parameter related to resource utilization by software service 102, a parameter related to requests by software service 102 to utilize resource 110, and/or any other suitable detectable parameter related to operations performed by software service 102 with respect to resource 110.

In some demonstrative embodiments, system 100 includes a workload classifier 106 capable of classifying the workload of software service 102 ("the runtime workload") by selecting a workload classification from a plurality of predefined workload classifications 107 based on a plurality of sampled values of the monitored parameter, e.g., as described in detail below. In on example, classifier 106 may sample he plurality of values of the at least one parameter, e.g., based on an input from monitor 104. In another example, the values may be sampled by out-of-band monitor 104 and provided to classifier 106.

In one embodiment, out-of-band monitor 104 and classifier 106 may be implemented as separate modules of system 100. In another embodiment, out-of-band monitor 104 and classifier 106 may be commonly implemented by a single module of system 100.

In some demonstrative embodiments, workload classifications 107 may correspond to a plurality of predefined workload schemes, respectively. Classifier 106 may also include a plurality of predefined workload signatures 109 corresponding to the plurality of workload classifications 107, respectively.

In some demonstrative embodiments, a workload signature of workload signatures 109, which corresponds to a workload classification of classifications 107, includes one or more statistical values corresponding to one or more values of the monitored parameter, e.g., when software service 102 is subject to a workload scheme corresponding the workload classification. In one example, the one or more statistical values include a plurality of occurrence values, each representing a number of occurrences of a value of the plurality of sampled values; and the workload signature includes a predefined number of maximal values of the plurality of occurrence values, e.g., as described below.

In some demonstrative embodiments, classifier 106 may be capable of determining one or more of workload classifications 107 and/or workload signatures 109, for example, offline, e.g., by performing a workload classification definition process, as described in detail below. However, embodiments of the invention are not limited in this respect, and in some embodiments one or more of workload classifications 107 and/or workload signatures 109 may be received by classifier 106, e.g., from one or more elements of system 100, and/or from one or more other systems, e.g., via a communication connection or network.

In some demonstrative embodiments, one or more of workload signatures 109 may be associated with any suitable additional information including, for example, predicted workload information 111. The predicted workload information 111 corresponding to a workload signature of signatures 109 includes, for example, a prediction of a workload immediately following the occurrence of the workload signature.

In some demonstrative embodiments, workload signatures 109 and/or predicted workload information 111 are determined, e.g., offline, by applying the plurality of workload schemes to software service 102 during a plurality of learning periods, respectively. Although embodiments of the invention are not limited in this respect, in some demonstrative embodiments each learning period may last for at least thirty seconds, e.g., at least one minute. A workload signature of signatures 109 may be determined, for example, by performing out-ofband monitoring of at least one parameter of software service 102 during the learning period; sampling a plurality of values of the at least one parameter; determining one or more statistical values corresponding to the plurality of sampled values; and determining the workload signature base on the statistical values, e.g., as described below with reference to FIG. 2.

In some demonstrative embodiments, during a runtime period classifier 106 may determine the runtime workload signature of software service 102. For example, classifier 106 may determine the runtime workload signature based on a plurality of sampled values of at least one parameter; determine one or more statistical values corresponding to the plurality of sampled values; and determine the runtime workload signature base on the statistical values, e.g., as described below with reference to FIG. 2.

In some demonstrative embodiments, classifier 106 may classify the runtime workload of software service 102 by selecting a workload classification from workload classifications 107 based on a comparison between the runtime workload signature and workload signatures 109. For example, the workload of software service 102 may be classified as a workload classification of classifications 107 corresponding to a workload signature of signatures 109 having a best match with the runtime workload signature. The best match between the runtime workload signature and workload signatures 109 may be determined using any suitable match recognition method and/or algorithm, for example, a nearest neighbor matching algorithm and/or any other matching algorithm.

In some demonstrative embodiments, system 100 and/or a management system (not shown) associated with system 100, may allocate resources to software service 102 based on the runtime workload classification, optionally taking into account any additional information in the annotations corresponding to the workload signature. System 100 and/or the management system may implement any suitable resource allocation and/or resource management mechanism, algorithm, and/or method to allocate the resources to software service 102.

In some demonstrative embodiments, classifier 106 may dynamically, continuously and/or periodically determine and/or reclassify the workload of software service 102, e.g., during runtime, for example, substantially in real-time. For example, classifier 102 may classify the workload of software service 102 during a first runtime period, and update and/or reclassify the workload of software service 102 during a second runtime period, for example, based on a plurality of runtime values of the at least one parameter.

Figure 2:
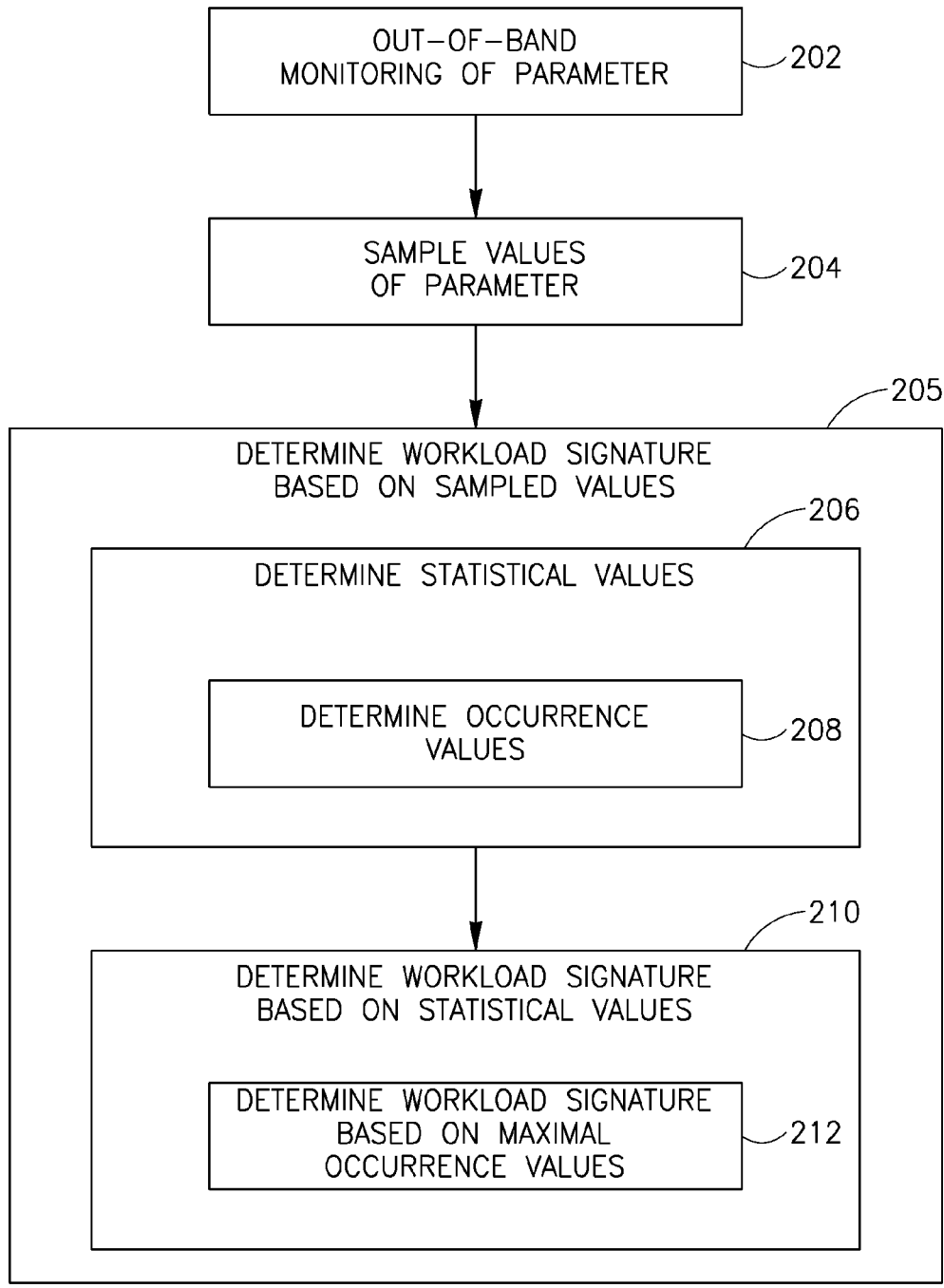
FIG. 2 is a schematic flow-chart illustration of a method of determining a workload signature of a software service in accordance with some demonstrative embodiments.

Reference is made to FIG. 2, which schematically illustrates a method of determining a workload signature of a software service in accordance with some demonstrative embodiments. Although embodiments of the invention are not limited in this respect, according to some demonstrative embodiments one or more operations of the method of FIG. 2 may be implemented by a system, e.g., system 100, an out-of band monitor, e.g., out-of band monitor 104 (FIG. 1), and/or a classifier, e.g., classifier 106 (FIG. 1), to determine a workload signature of a software service, e.g., software service 102. The workload signature may include a runtime workload signature to be determined during a runtime period of the software service, and/or a workload signature, e.g., of signatures 109 (FIG. 1), to be determined during a learning period.

As indicated at block 202, the method may include performing out-of-band monitoring of at least one parameter of the software service. In one example, out-of-band monitor 104 (FIG. 1) performs out-of-band monitoring of at least one parameter of software service 102 (FIG. 1) during one or more learning periods in which software service 102 (FIG. 1) is subject to one or more workload schemes, e.g., as described above. In another example, out-of-band monitor 104 (FIG. 1) performs out-of-band monitoring of the at least one parameter of software service 102 (FIG. 1) during a runtime period of software service 102 (FIG. 1), e.g., as described above.

As indicated at block 204 the method may include sampling a plurality of values of the monitored parameter. In some demonstrative embodiments, sampling the plurality of values of the parameter may be performed as part of performing the out-of-band monitoring of the parameter. In other embodiments, sampling the plurality of values of the parameter may be performed separately from performing the out-of-band monitoring of the parameter. In one example, classifier 106 (FIG. 1) and/or out-of-band monitor 104 (FIG. 1) sample the plurality of values during the one or more learning periods, e.g., as described above. In another example, classifier 106 (FIG. 1) and/or out-of-band monitor 104 (FIG. 1) sample a plurality of runtime values of the monitored parameter during the runtime period of software service 102 (FIG. 1), e.g., as described above.

As indicated at block 205, the method may also include determining the workload signature based on the plurality of sampled values, e.g., as described below.

As indicated at block 206, the method may also include determining a plurality of statistical values by applying a statistical function to the plurality of values. In one example, classifier 106 (FIG. 1) applies a predefined statistical function to the plurality of values sampled during the one or more learning periods, e.g., as described above. In another example, classifier 106 (FIG. 1) applies a predefined statistical function to the plurality of sampled runtime values, e.g., as described above.

As indicated at block 208, determining the plurality of statistical values may include determining a plurality of occurrence values, each representing a number of occurrences of a value of the plurality of sampled values. In one example, classifier 106 (FIG. 1) tallies each of the sampled values during at least thirty seconds, e.g., at least one minute, of the learning period. In another example, classifier 106 (FIG. 1) tallies each of the sampled runtime values during at least thirty seconds, e.g., at least one minute, of the runtime period.

As indicated at block 210, the method may also include determining the workload signature based on at least one of the statistical values. In one example, classifier 106 (FIG. 1) determines a workload signature of signatures 109 (FIG. 1) based on at least one of the statistical values determined during the learning period. In another example, classifier 106 (FIG. 1) determines a runtime workload signature of software service 102 based on at least one of the runtime statistical values.

As indicated at block 212, the method may also include determining the workload signature based on a predefined number of maximal values of the plurality of occurrence values. In one non-limiting example, classifier 106 (FIG. 1) generates a histogram representing the plurality of occurrence values; sorts the plurality of occurrence values, e.g., by decreasing value; and selects a predefined number of the occurrence values, e.g., maximal occurrence values.

Figure 3:
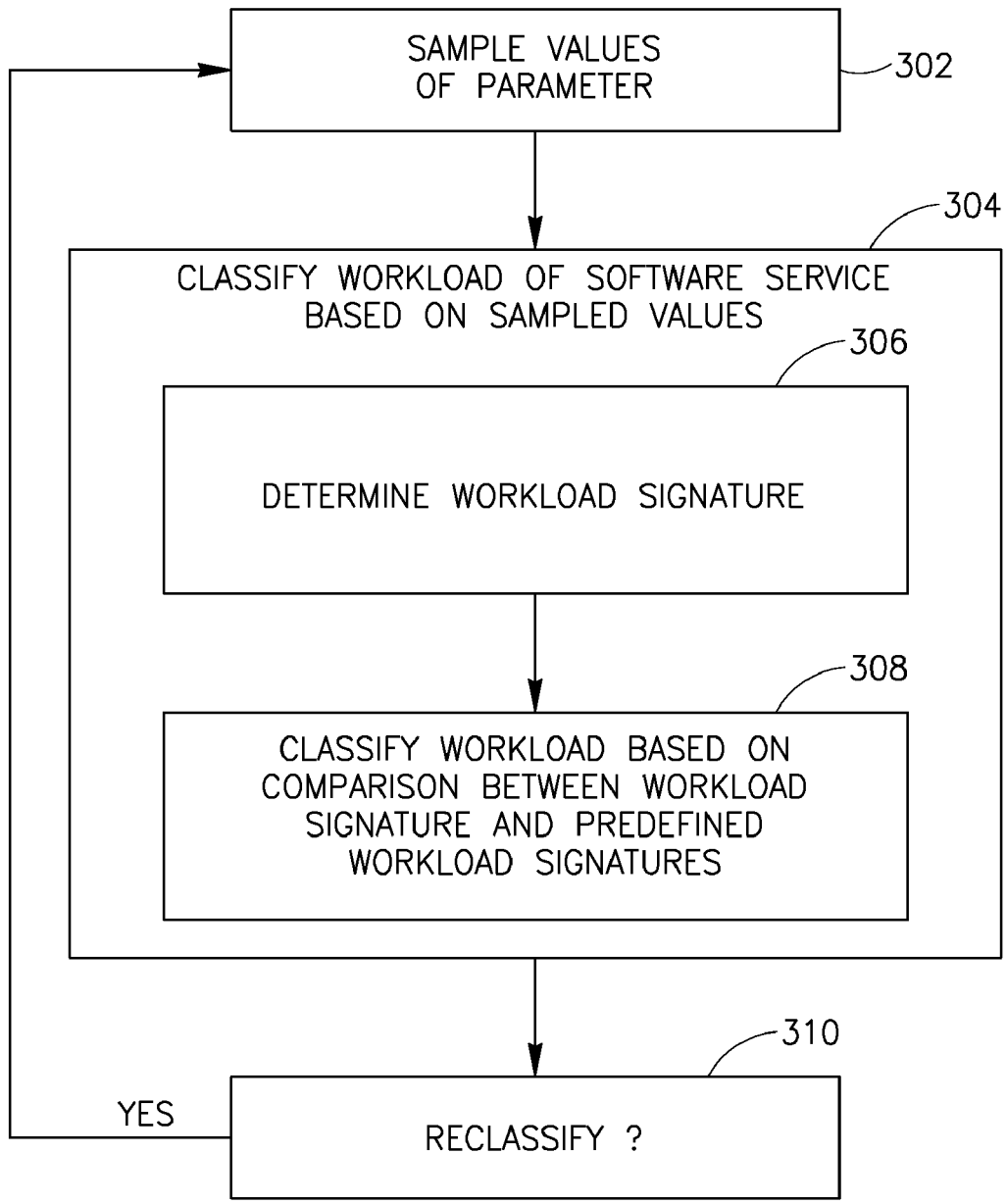
FIG. 3 is a schematic flow-chart illustration of a method of classifying a workload of a software service in accordance with some demonstrative embodiments.

Reference is now made to FIG. 3, which schematically illustrates a method of classifying a workload of a software service in accordance with some demonstrative embodiments of the invention. Although embodiments of the invention are not limited in this respect, according to some demonstrative embodiments one or more operations of the method of FIG. 3 may be implemented by a system, e.g., system 100, an out-of band monitor, e.g., out-of band monitor 104 (FIG. 1), and/or a classifier, e.g., classifier 106 (FIG. 1), to classify a workload of a software service, e.g., software service 102, for example, during a runtime period of the software service.

As indicated at block 302, the method may include sampling a plurality of values of at least one parameter of the software service by performing out-of-band monitoring of the at least one parameter. For example, classifier 106 (FIG. 1) and/or out-of-band monitor 104 (FIG. 1) may sample a plurality of values of at least one parameter monitored by out-of band monitor 106 (FIG. 1).

As indicated at block 304, the method may include classifying the workload of the software service by selecting a workload classification from a plurality of predefined workload classifications based on the plurality of values. For example, classifier 106 (FIG. 1) classifies the workload of software service 102 (FIG. 1) by selecting a predefined workload classification of workload classifications 107 (FIG. 1) based on the plurality of sampled values.

As indicated at block 306, classifying the workload of the software service may include determining a workload signature of the workload based on the plurality of values. For example, classifier 106 (FIG. 1) determines the runtime workload signature of software service 102 (FIG. 1) based on the sampled values of the monitored parameter, e.g., as described above with reference to FIG. 2.

As indicated at block 308, classifying the workload of the software service may include selecting the workload classification from the plurality of workload classifications based on a comparison between the workload signature and a plurality of predefined workload signatures corresponding to the plurality of workload classifications. For example, classifier 106 (FIG. 1) selects the workload classification for classifying the workload of software service 102 (FIG. 1) by comparing the runtime workload signature and workload signatures 109 (FIG. 1).

As indicated at block 310, the method may include reclassifying the workload of the software service, e.g., continuously or periodically. For example, the method may include sampling another plurality of values of the at least one parameter; and re-classifying the workload of the software service by re-selecting a workload classification from the plurality of predefined workload classifications based on the other plurality of values.

Some demonstrative embodiments are described herein with relation to classifying the workload of a software service based on a plurality of sampled values of one parameter, which is monitored out-of-band. However, embodiments of the invention are not limited in this respect. For example, other embodiments may include classifying the workload of the software service based on a plurality of sampled values of a plurality of parameters, which are monitored out-of-band. In one example, a plurality of parameters may be sampled at each sampling point, for example, using a symmetric multi-processor (SMP) machine. According to this example, determining the workload signature includes determining a plurality of statistical values by applying a statistical function to the plurality of sampled values of the plurality of parameters. For example, a plurality of occurrence values may be determined for each of the parameters. In one embodiment, a univariate histogram may be determined based on the plurality of occurrence values, e.g., by considering the cross product of the occurrence values of the plurality of parameters. In another embodiment, the workload signature may be based on a multivariate histogram, which may be determined based on the plurality of occurrence values.

Other suitable operations or sets of operations may be used in accordance with embodiments of the invention.

Some embodiments, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid-state memory, magnetic tape, a removable computer diskette, a RAM, a ROM, a rigid magnetic disk, and an optical disk. Some demonstrative examples of optical disks include CD-ROM, CD-R/W, and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method of classifying a workload of a software service, the method comprising:

sampling a plurality of values of at least one parameter of the software service by performing out-of-band monitoring of said parameter, wherein changes in said parameter values indicate a change in the workload of the software service in real-time;

determining a workload signature for the software service based on statistical analysis of said sampling of plurality of values, wherein said workload signature provides a representation of the workload of the software service for a first period associated with said sampling;

comparing the workload signature with a plurality of predefined workload signatures stored in a workload signature database, wherein each of the plurality of predefined workload signatures are respectively associated with a corresponding workload classification from among a plurality of predefined workload classifications; and matching the workload of said software service for the first period with a first workload classification from among the plurality of predefined workload classifications;

wherein the workload of the software service for a second period of real-time sampling is reclassified to a second workload classification, based on a workload signature calculated for the second period of time matching the second workload classification.

2. The method of claim 1, further comprising:

allocating first resources to the software service according to the first workload classification, and allocating second resources to the software service according to the second workload classification.

3. The method of claim 2, wherein determining said workload signature comprises:

determining a plurality of statistical values by applying a statistical function to said plurality of values; and determining said workload signature based on at least one of said statistical values.

4. The method of claim 3, wherein said statistical values comprise a plurality of occurrence values, each representing a number of occurrences of a value of said plurality of values, and wherein determining said workload signature comprises determining said workload signature based on a predefined number of maximal values of said plurality of occurrence values.

5. The method of claim 2, wherein said plurality of workload classifications correspond to a plurality of predefined workload schemes, and wherein each of said plurality of workload signatures comprises one or more statistical values corresponding to one or more values of said parameter when said software service is subject to a workload scheme of said plurality of workload schemes.

6. The method of claim 1 comprising:

sampling another plurality of values of said at least one parameter; and re-classifying the workload of said software service by re-selecting a workload classification from said plurality of predefined workload classifications based on said other plurality of values.

7. The method of claim 1, wherein said software service is a virtual machine or an application program.

8. A computing system, the system comprising:

one or more processors for executing a software service, wherein program code for the software service is stored on one or more data storage mediums and is loaded into memory for execution;

an out-of-band monitor for sampling a plurality of values of at least one parameter of the software service by performing out-of-band monitoring of said parameter, wherein changes in said parameter values indicate a change in the workload of the software service in real-time;

a workload classifier for:

determining a workload signature for the software service based on statistical analysis of said sampling of plurality of values, wherein said workload signature provides a representation of the workload of the software service for a first period associated with said sampling;

comparing the workload signature with a plurality of predefined workload signatures stored in a workload signature database, wherein each of the plurality of predefined workload signatures are respectively associated with a corresponding workload classification from among a plurality of predefined workload classifications; and matching the workload of said software service for the first period with a first workload classification from among the plurality of predefined workload classifications;

wherein the workload of the software service for a second period of real-time sampling is reclassified to a second workload classification, based on a workload signature calculated for the second period of time matching the second workload classification.

9. The computing system of claim 8, wherein first resources are allocated to the software service according to the first workload classification and second resources are allocated to the software service according to the second workload classification.

10. The computing system of claim 9, wherein said classifier is capable of determining a plurality of statistical values by applying a statistical function to said plurality of values; and determining said workload signature based on at least one of said statistical values.

11. The computing system of claim 10, wherein said statistical values comprise a plurality of occurrence values, each representing a number of occurrences of a value of said plurality of values, and wherein said classifier is capable of determining said workload signature based on a predefined number of maximal values of said plurality of occurrence values.

12. The computing system of claim 9, wherein said plurality of workload classifications correspond to a plurality of predefined workload schemes, and wherein each of said plurality of workload signatures comprises one or more statistical values corresponding to one or more values of said workload-related parameter when said software service is subject to a workload scheme of said plurality of workload schemes.

13. The computing system of claim 8, wherein said classifier is capable of re-classifying the workload of said software service by re-selecting a workload classification from said plurality of predefined workload classifications based on another plurality of sampled values of said at least one parameter.

14. The computing system of claim 8, wherein said software service is a virtual machine or an application program.

15. A computer program product comprising a non-transient computer-useable storage medium including a computer-readable program, wherein the computer-readable program when executed on a computer causes the computer to:

sample a plurality of values of at least one parameter of the software service by performing out-of-band monitoring of said parameter, wherein changes in said parameter values indicate a change in the workload of the software service in real-time;

determine a workload signature for the software service based on statistical analysis of said sampling of plurality of values, wherein said workload signature provides a representation of the workload of the software service for a first period associated with said sampling;

compare the workload signature with a plurality of predefined workload signatures stored in a workload signature database, wherein each of the plurality of predefined workload signatures are respectively associated with a corresponding workload classification from among a plurality of predefined workload classifications; and match the workload of said software service for the first period with a first workload classification from among the plurality of predefined workload classifications, wherein the workload of the software service for a second period of real-time sampling is reclassified to a second workload classification, based on a workload signature calculated for the second period of time matching the second workload classification.

16. The computer program product of claim 15, wherein first resources are allocated to the software service according to the first workload classification and second resources are allocated to the software service according to the second workload classification.

17. The computer program product of claim 16, wherein said computer-readable program causes said computer to determine a plurality of statistical values by applying a statistical function to said plurality of values; and determine said workload signature based on at least one of said statistical values.

18. The computer-readable program of claim 17, wherein said statistical values comprise a plurality of occurrence values, each representing a number of occurrences of a value of said plurality of values, and wherein said computer-readable program causes said computer to determine said workload signature based on a predefined number of maximal values of said plurality of occurrence values.

19. The computer-readable program of claim 16, wherein said plurality of workload classifications correspond to a plurality of predefined workload schemes, and wherein each of said plurality of workload signatures comprises one or more statistical values corresponding to one or more values of said workload-related parameter when said software service is subject to a workload scheme of said plurality of workload schemes.

20. The computer-readable program of claim 15, wherein said computer-readable program causes said computer to sample another plurality of values of said at least one parameter; and re-classify the workload of said software service by re-selecting a workload classification from said plurality of predefined workload classifications based on said other plurality of values.

* * * * *